United States Patent [19]

Goyert et al.

[11] Patent Number: 4,762,884
[45] Date of Patent: Aug. 9, 1988

[54] PROCESS FOR THE PRODUCTION OF RADIATION-CROSSLINKED THERMOPLASTIC POLYURETHANES

[75] Inventors: Wilhelm Goyert; Jürgen Winkler, both of Leverkusen; Hermann Perrey, Krefeld; Herbert Heidingsfeld, Frechen, all of Fed. Rep. of Germany

[73] Assignee: Bayer Aktiengesellschaft, Leverkusen, Fed. Rep. of Germany

[21] Appl. No.: 40,428

[22] Filed: Apr. 20, 1987

[30] Foreign Application Priority Data

Apr. 24, 1986 [DE] Fed. Rep. of Germany ....... 3613790

[51] Int. Cl.$^4$ ............................................. C08G 18/40
[52] U.S. Cl. ........................................ 525/28; 525/55; 525/418; 525/455; 528/64; 528/66; 528/75; 528/83; 528/85; 522/78; 522/90; 522/93; 522/96; 264/211.24
[58] Field of Search ............... 525/28, 55, 418, 455; 528/64, 66, 75, 83, 85; 522/78, 90, 93, 96, 428, 450, 454, 455, 920, 928; 264/211.24

[56] References Cited

U.S. PATENT DOCUMENTS

| | | | |
|---|---|---|---|
| 3,641,199 | 2/1972 | Niederbauser et al. | 260/859 |
| 4,073,828 | 2/1978 | Ferrarini et al. | 260/859 |
| 4,097,439 | 6/1978 | Darling | 260/31.2 |
| 4,153,776 | 5/1979 | Friedlander et al. | 528/49 |
| 4,245,081 | 1/1981 | Quiring et al. | 528/65 |
| 4,399,239 | 8/1983 | Herwig et al. | 521/137 |
| 4,436,286 | 3/1984 | Schnabel et al. | 266/44 |
| 4,507,458 | 3/1985 | Shiraki et al. | 528/75 |

FOREIGN PATENT DOCUMENTS

| | | |
|---|---|---|
| 080665 | 6/1983 | European Pat. Off. |
| 144065 | 6/1985 | European Pat. Off. |
| 3444500 | 11/1985 | Fed. Rep. of Germany |
| 3412002 | 12/1985 | Fed. Rep. of Germany |

*Primary Examiner*—John Kight
*Assistant Examiner*—S. A. Acquah
*Attorney, Agent, or Firm*—Gene Harsh; Joseph C. Gil; Aron Preis

[57] ABSTRACT

The invention is directed to a process for the production of polyurethanes suitable for thermoplastic processing comprising mixing
 I. at least 75% by weight of preformed thermoplastic polyurethane elastomers, or of a blend of
  (A) substantially bifunctional, compounds
  (B) substantially bifunctional chain-extending agents
  (C) organic diisocyanates and optionally
  (D) lubricants or other known additives
said blend characterized in that it contains no peroxides and polymerization initiators which decompose into radicals under the effect of actinic light and further in that the molar ratio of the sum of said (A) and said (B) to said (C) is between 0.9 to 1.1, with
 II. (E) from 4 to 24% by weight of a crosslinking agent and
 III. (F) from 0.01 to 3% by weight of a polymerization inhibitor and/or an antioxidant,
by adding said II and said III to said I at a temperature below 230° C., and the cooling the mixture to below 130° C. in less than 5 minutes in a continuous extruder and optionally granulating the resulting polyurethane.

8 Claims, 2 Drawing Sheets

PROCESS FOR THE PRODUCTION OF RADIATION-CROSSLINKED THERMOPLASTIC POLYURETHANES

FIELD OF THE INVENTION

The invention relates to thermoplastic polyurethanes and more particularly to radiation-crosslinked polyurethanes, to a process for their production and to their use.

SUMMARY OF THE INVENTION

This invention relates to simple, preferably continuous, industrial processes for the production of thermoplastic polyurethanes (TPU), preferably in granulate form. These polyurethane granulates may be processed by standard methods into shaped articles, such as cables, hoses, profiles and blown extrudates. The moldings are crosslinked by high-energy $\beta$- and/or $\gamma$-rays, preferably by electron beams ($\beta$-rays), using optimal radiation doses. It is possible in this way to obtain moldings distinguished by increased dimensional stability and compressive strength under heat, solvent resistance, low friction coefficient and, in particular by nondrip behavior in a flame.

In the process, preformed polyurethane elastomers or, preferably, their usual starting materials A to D (A) substantially bifunctional compounds containing Zerewitinoff-active H-atoms and having a molecular weight of from 400 to 20,000, more especially polyhydroxyl compounds, (B) substantially bifunctional chain-extending agents, such as diols or diamines having a molecular weight of from 32 to 399, preferably diols having a molecular weight of from 62 to 230 and (C) organic diisocyanates, preferably aromatic diisocyanates, more especially diphenylmethane diisocyanates, (D) optionally stabilizers, lubricants, reinforcing materials, such as glass fibers, or other additives known per se, but no peroxides or other photoactivators, (E) and in addition acrylate and/or methacrylate compounds as crosslinking agents in certain quantitative ratios (F) and in the presence of polymerization inhibitors and/or antioxidants are reacted and homogeneously mixed in the melt within certain temperature limits, particularly during and after the addition of the acrylate and/or methacrylate compounds, and the reaction mixture is then cooled down, preferably rapidly, and is then optionally granulated.

The processes are preferably carried out continuously by belt casting, but more especially in (reaction) screw extruders or in (reaction) kneaders. The polyurethane elastomers containing acrylate and/or methacrylate cross-linkers are preferably cooled in liquid baths, more especially in water. The granulates are dried and may then be processed into a variety of different molded articles, more especially hoses, cable sheaths, profiles, injection moldings and blow-formed articles.

The shaped articles are then crosslinked by exposure to $\gamma$- and/or $\beta$-rays, radiation preferably to electron beams ($\beta$-rays). Crosslinking in this way provides the thermoplastic polyurethanes with particular properties which it would otherwise be difficult or impossible to obtain. For example, the dimensional stability of cable sheaths under heat increases from 100° C. to 200°–220° C. The shaped articles are then more solvent-resistant to polar media, such as for example methylene chloride or tetrahydrofuran, and the friction coefficient of the shaped articles is reduced. By contrast, polyurethane elastomers without an added crosslinker do not show the above-mentioned irradiation induced improvements, but instead are characterized by serious polymer degradation. Surprisingly, polyurethanes in which (meth)acrylates have been incorporated in the polyurethane molecule through functional groups show distinctly poorer properties and are not preferred.

BACKGROUND OF THE INVENTION

Various efforts have been made in the past to synthesize polyurethane elastomers showing improved radiation crosslinkability. Thus, EP-A No. 144,065 describes an immersion process for the production of photo- and-/or UV-crosslinkable polyurethane safety glass. The polyurethanes are generally based on aliphatic isocyanates. The films thus obtained have to be subjected to a very elaborate immersion process to allow penetration of the unsaturated compounds used for crosslinking based on polyfunctional acrylates or methacrylates with addition of (UV-) radiation-activatable initiators, such as benzophenone derivatives. In spite of this, the cross-linking agents are only present at the surface of the film. This method only gives a very thin layer which can be crosslinked with UV-light. By contrast, it is possible by the presently claimed process to produce shaped polyurethane articles which may have any thicknesses, contain acrylates and/or methacrylates uniformly distributed within the shaped article and undergo rapid and intensive crosslinking by $\beta$- and/or $\gamma$-rays.

EP-A No. 48,913 describes polyurethanes containing (terminal or lateral) double bonds which are suitable for the production of photopolymerizable recording materials, for example printing plates and photoresist materials, which are subsequently crosslinked by light/UV-radiation. The photopolymerizable polyurethanes are obtained by the reaction of polyether/diisocyanate-based NCO-prepolymers with incorporable bis-acrylate diols. They may additionally contain a low molecular weight acrylate or methacrylate of a dihydric or polyhydric alcohol as polymerizable compounds. They additionally contain photoinitiators and are normally polymerized with UV-light, although electron beams, X-rays and laser beams are also mentioned as actinic radiation. The content of photopolymerizable compounds in the photopolymerizable mixture, which may also contain polymeric binders, is generally from 20 to 100% by weight and preferably from 30 to 60% by weight.

In addition, the prior art describes a number of methods for synthesizing in solution polyurethanes containing ethylenically unsaturated groups through incorporable compounds. These polyurethanes are radically crosslinked (for example with peroxides) to form coatings, preferably in solution in excess ethylenically unsaturated monomers (cf. U.S. Pat. Nos. 4,097,439, 4,073,828, 3,641,199 and 4,153,776).

U.S. Pat. No. 4,436,286 describes polyurethanes which contain double bonds and to which acrylates or methacrylates are added. These polyurethanes are synthesized by an elaborate multistage process. In addition, in contrast to the claimed procedure, these polyurethane elastomers have to contain double bonds in the molecule.

DE-OS No. 3,412,002 describes a process for the production of an extrudable material based on thermoplastic polyurethane elastomers which contains crosslinking agents and which is crosslinkable by electron beams. In this process, the crosslinking agent is added to the polyurethane elastomer granulates in liquid form, and is applied (by rolling) to the surface of standard granulates in such a quantity that, after a predetermined time, the crosslinking agent diffuses completely into the granulate particles of the polyurethane until the surface of those particles appears dry again. The granulate may then be processed by means of an extruder without any danger of clump formation by the granulate particles sticking to one another. The quantity of the crosslinking agent is so large that the radiation dose required for crosslinking need only be high enough to ensure that the polymer chain does not undergo degradation with loss of strength of the polyurethane material in the extruded material. The polyfunctional unsaturated compounds used as crosslkinking agents (in quantities of up to 40% by weight) are, for example, acrylates and methacrylates, allyl compounds, dimaleic imides, epoxidized, polyfunctional or other bifunctional unsaturated compounds.

EP-A No. 80,665 describes a process for the production of crosslinkable sheet-form materials in which a preformed thermoplastic polymer, for example polyurethane or butadiene-acrylonitrile copolymer, is introduced into a twin-screw extruder and melted, mixed in the second zone with low-viscosity ethylenically unsaturated compounds as crosslinking promoters (for example (meth)acrylates of monohydric or polyhydric alcohols), crosslinking aids, such as peroxides, and photoactivators and, optionally, other additives, such as antioxidants, at temperatures of up to 220° C., the resulting mixture is degassed and discharged through flat dies and, finally, is adjusted to the required layer thickness using pairs of heated rolls.

According to EP-A No. 48,913, NCO-prepolymers (based on polyether diols and tolylene diisocyanates) are reacted with certain incorporable bis-acrylate diols in solvents, such as toluene or tetrahydrofuran, optionally in the presence of catalysts or peroxide initiators. The solvents are removed during the shaping process and the shaped articles obtained are optionally crosslinked. However, the polymers may also be crosslinked in solution, the highly crosslinked rubber is comminuted and then molded by compression molding at an elevated temperature.

DE-OS No. 3,444,500 describes non-inflammable, electrical or optical cables of which at least the outer layer of the cable sheath consists completely or partly of radiation-crosslinked polyurethane. Of the various types of polyurethane, a so-called ether type has proved to be the most advantageous because, in addition to its other properties essential to the invention, it is resistant to hydrolysis and immune to bacterial attack.

DETAILED DESCRIPTION OF THE INVENTION

Figure 1:
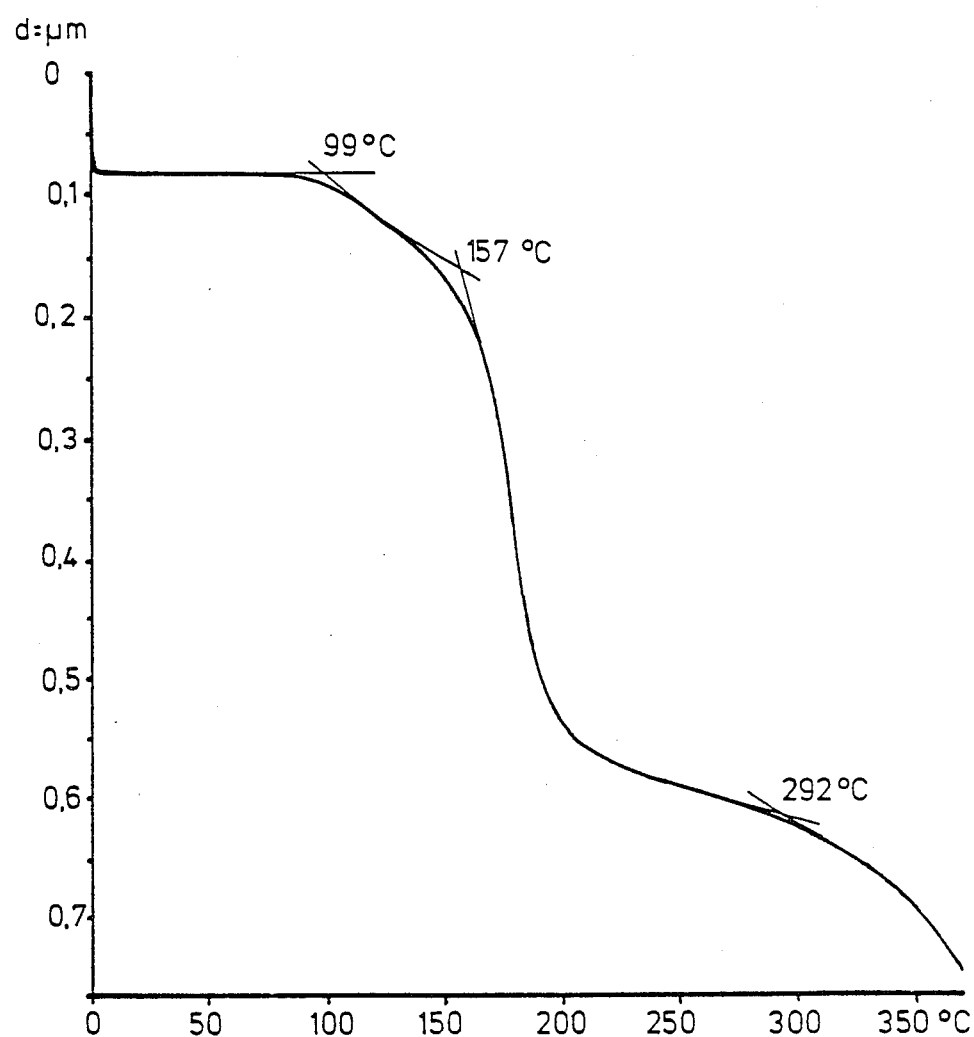
Figure 2:
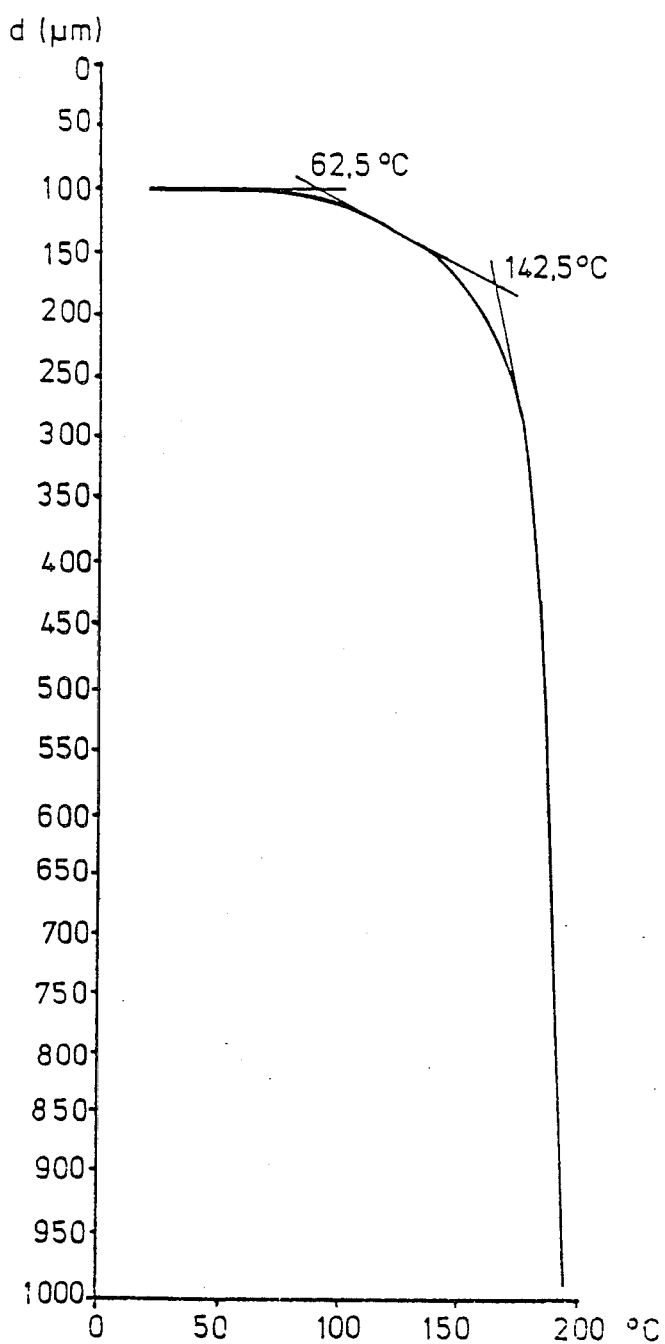

FIG. 1 shows the thermo-mechanical measurement (depth of penetration vs temperature) for a polyurethane of the invention (Example 1A), and FIG. 2 shows the corresponding measurement for Example K which represents a non-crosslinked thermoplastic polyurethane.

The object of the present invention is to produce from a preformed polyurethane elastomer (or preferably from the starting materials for a polyurethane, such as polyols, diisocyanates and chain-extending agents) in the presence of certain acrylate or methacrylate compounds and polymerization inhibitors an uncrosslinked, homogeneous polyurethane elastomer mixture, preferably in granulate form, which may be thermoplastically processed to form shaped articles. These shaped articles are crosslinkable by exposure to $\beta$- and/or $\gamma$-rays, preferably to electron beams, resulting in improvements in many of their properties and without any significant radiation-induced degradation through harmful cleavage of the polyurethane chains. In the process, which is preferably continuous, certain production parameters have to be strictly observed. Thus, the mixing ratio has to be adjusted within a predetermined range. In addition, steps have to be taken to ensure that no harmful crosslinking takes place during the production process. Accordingly, the PUR-elastomers must contain no peroxides or photoactivators. Finally, the crosslinked shaped articles obtainable from the polyurethanes exhibit special, and in some cases new, properties; for example mention may be made of the improved resistance to hydrolysis, improved dimensional stability under heat, improved solvent resistance, improved compression set, improved friction coefficient, no susceptibility to stress crazing and, in particular, no dripping in a flame.

This object is achieved by the choice of certain polyurethane and acrylate components which are reacted in specific quantitative ratios and, under certain temperature conditions during the production of the polyurethanes from their starting components or which are, in less preferred process, added to the preformed PUR-elastomers. In addition, a relatively large quantity of inhibitors or stabilizers has to be present during the production process. In spite of this, the shaped articles produced from the granulate may still be subjected to effective crosslinking by exposure to $\gamma$- or $\beta$-rays (electron beams).

Accordingly, the present invention relates to a process for the production of thermoplastic, uncrosslinked, acrylate- and/or methacrylate-containing polyurethanes which, after molding may be crosslinked by exposure to $\gamma$-rays and/or electron beams. The process is characterized in that to a quantity of from at least 75%, by weight of preformed thermoplastic polyurethane elastomers, preferably of standard starting materials for the production of thermoplastic polyurethane elastomers, comprising A, B, C and optionally D, there are added 4–24% of Component E and 0.01–3%, preferably 0.03–1% by weight of Component F, wherein in a preferred embodiment the sum of said compounds amounts to 100%.

(A) denotes substantially bifunctional, relatively high molecular weight compounds essentially containing two Zerewitinoff-active hydrogen atoms per molecule and having a molecular weight of from 400 to 20,000, preferably polyhydroxyl compounds (B) denotes substantially bifunctional chain-extending agents, such as diols and/or diamines, having a molecular weight of from 32 to 399 and preferably from 62 to 230, (C) denotes organic diisocyanates, preferably aromatic diisocyanates, more especially diphenylmethane-4,4'-diisocyanate, the molar ratio of A plus B to the diisocyanates C being from 0.9 to 1.1, (D) denotes any of the known stabilizers, lubricants other known additives per se, and with exception of peroxides and photopolymerization initiators which decompose into radicals in actinic light, (E) denotes monomeric acrylate and/or methacrylate compounds as crosslinking agents, preferably acrylate and/or methacrylate compounds of dihydric or polyhydric alcohols, (F) denotes polymerization inhibitors and/or antioxidants.

Components E and F are added to the above-mentioned starting components, to the reaction mixture or to the reacting masses before complete formation of the highly polymeric polyurethane or (less preferably) to the preformed thermoplastic polyurethane elastomers at a temperature below 230° C. preferably $\leq$ 210° C., is not exceeded. After the addition of Components E and F, the resulting mixture is cooled in continuous extruders to temperatures below 130° C. in less than 5 minutes or is treated by casting for no longer than 30 minutes at temperatures of $\leq$ 180° C. and is then optionally granulated.

The process is preferably carried out continuously either by continuously adding the crosslinking agent (E) to the PUR-elastomer melt in extruders or the like or, preferably, by reactive processes in which the crosslinking agents are added to the polyurethane-forming starting materials or during the reaction. Continuous processes correspond to the belt casting process known per se or to the reactive extrusion or reactive casting process, preferably using self-combing twin-screw extruders or screw kneaders rotating in the same direction (so-called co-kneaders).

The process is particularly characterized in that predominantly hydroxyl-group-free, predominantly non-incorporable esters of acrylic and/or methacrylic acid with aliphatic, cycloaliphatic or araliphatic monoalcohols containing at least 6 carbon atoms in the alcohol residue, but preferably diols and/or polyols containing three or more hydroxyl groups or ethoxylation and/or propoxylation products of the alcohols containing from 2 to 6 ethylene oxide and/or propylene oxide linkages per molecule are added as the monomeric acrylate and/or methacrylate compounds (E).

The process is particularly characterized in that the monomeric acrylate and/or methacrylate compounds (E) added are acrylic acid and/or methacrylic acid esters of diols containing from 4 to 12 carbon atoms or of tri- or tetraalcohols, more especially 1,4-butanediol acrylate, butanediol-bis-methacrylate, but especially trimethylol propane tris-acrylate, trimethylol propane trimethacrylate and also pentaerythritol tetraacrylate or pentaerythritol tetramethacrylate.

More particularly, the crosslinking agent (E) may be dissolved in component (A) together with component (F), after which the reaction by which the polyurethane elastomer is formed is carried out. Alternatively, the crosslinking agents (E) and/or inhibitors (F) and, optionally, parts of component (A) or (B) are added to the reacting mixture during the continuous PU-elastomer-forming reaction, preferably after OH/NCO polyaddition reaction is substantially completed. In either case, the preferred reaction is continuous.

The invention also relates to the use of the acrylate- and/or methacrylate-containing polyurethane elastomers thus obtained in thermoplastically shaping articles and then crosslinking of the shaped articles by exposure to β-rays with a radiation dose of from 10 to 30 Mrad.

The starter components, processes and apparatus used for the production of polyurethanes are conventional.

Thus, suitable essentially linear, relatively high molecular weight compounds with a molecular weight of 400 to 20,000, preferably 800 to 4,000, containing essentially two Zerewitinoff-active hydrogen atoms (component (A)) include virtually any compounds containing approximately two reactive groups, such as hydroxyl groups, primary and/or secondary amino groups, SH groups, carboxyl groups and/or other reactive groups, for example hydrazide groups. The compounds are for example bi-functional hydroxypolyesters, hydroxypolylactones, hydroxypolyethers, hydroxypolythioethers, hydroxypolyesteramides, hydroxypolycarbonates, hydroxyacetals or vinyl polymers containing hydroxy groups or other terminal groups or compounds already containing urethane and/or urea groups. These compounds have been described in detail, for example, in DE-OS Nos. 2,302,564, 2,423,764, 2,549,372 (U.S. Pat. No. 3,963,679), DE-OS No. 2,402,840 (U.S. Pat. No. 3,984,607), DE-AS No. 2,457,387 (U.S. Pat. No. 4,035,213) and in DE-OS Nos. 2,854,384 and 2,920,501).

The compounds preferably contain hydroxyl groups, for example polyester diols of straight-chain or branched aliphatic and/or cycloaliphatic diols and aliphatic dicarboxylic acids, especially adipic acid. However, they may also contain small amounts of aromatic dicarboxylic acids particularly phthalic acid and possibly even terephthalic acid, and hydrogenation products thereof. Hydroxypolycarbonates, hydroxypolycaprolactones or even hydroxypolyether diols based on ethylene oxide, propylene oxide, tetrahydrofuran or mixed polyesters of propylene oxide and/or ethylene oxide and/or tetrahydrofuran are also suitable.

Polyamino compounds of relatively high molecular weight of 400 to 20,000 as mentioned before, preferably containing primary aromatic amino groups, may also be used. Preferred representatives are obtained, for example, by (preferably basic) hydrolysis of corresponding NCO-prepolymers based on polyhydroxy compounds of relatively high molecular weight and excess aromatic diisocyanates. Examples of these processes may be found in DE-OS No. 2,948,419, DE-OS No. 3,039,600, DE-OS No. 3,112,118, EP-A No. 61,627, EP-A No. 71,132 and EP-A No. 97,869. The first of these patent specifications also describes other state-of-the-art processes for producing aromatic amino compounds of relatively high molecular weight, so-called amino polyethers, such as are suitable for the process according to the invention. Further production processes are described in DE-AS No. 1,694,152, FR-PS No. 1,415,317 and DE-AS No. 1,155,907.

Particularly preferred polyols (A) are adipic acid hydroxy polyesters, caprolactone diols and polycarbonate diols, optionally in admixture with hydroxy polyethers; adipic acid hydroxy polyesters of 1,4-butanediol and/or 1,6-hexanediol are especially preferred.

The chain-extending agents (B) used in accordance with the invention are known per se and are described, for example, in DE-OS Nos. 2,302,564, 2,423,764, 2,549,372, 2,402,840, 2,457,387 and 2,854,384. The compounds are, in particular, low molecular weight polyalcohols, preferably diols, diamines, especially aromatic diamines, hydrazines and hydrazide derivatives. Diethyltolylene diamines and isophorone diamine are mentioned as diamines. Aminoalcohols, such as ethanolamine, diethanolamine, N-methyldiethanolamine, 3- aminopropanol, or compounds such as hydrazine (hydrate) or carbodihydrazide, may also be used in accordance with the invention. Preferred chain-extending agents are diols, such as for example ethylene glycol, di- and triethylene glycol, 1,6-hexanediol and hydroquinone di-β-hydroxyethylether, particular preference being attributed to 1,4-butanediol, optionally in admixture with other diols, especially 1,6-hexanediol. The chain-extending agents have molecular weights of from 32 to 399 and preferably of from 62 to 230.

Monofunctional compounds in small quantities, for example 0.01 to 3% by weight, based on PU-solids, may be used as chain terminators. Examples include monoalcohols, such as butanol, 2-ethylhexanol, isobutyl alcohol, 1-octanol, stearyl alcohol, and monoamines, such as aniline, dibutylamine, N-methylstearylamine, piperidine or N,N-dimethylhydrazine.

Diisocyanates (C) suitable for the invention are the aliphatic, cycloaliphatic, araliphatic, aromatic and heterocyclic diisocyanates known per se. They are listed in detail in the publications cited in reference to components (A) and (B).

Preferred diisocyanates are hexamethylene diisocyanate, isophorone diisocyanate, naphthylene-1,5-diisocyanate, tetramethyl xylylene diisocyanate, 3,3'-dimethyl-4,4'-diisocyanatodiphenyl (TODI), 1,4-diisocyanatobenzene and the corresponding hydrogenated product, tolylene diisocyanates and, in particular, the diphenylmethane diisocyanate isomers. Most particularly preferred is 4,4'-diisocyanatodiphenylmethane or its isomer mixture with up to 5 mol % and preferably with from 1 to 4 mol % of 2,4'-diisocyanatodiphenylmethane, generally accompanied by very small quantities of the 2,2'-diisocyanatodiphenylmethane isomer.

The diisocyanates may optionally be used together with up to about 15 mol % (based on diisocyanate) of a higher polyisocyanate; however, the quantity in which the higher polyisocyanate is used must be limited so that the polyurethane elastomer obtained is still fusible or rather thermoplastic. A relatively large quantity of higher isocyanates should generally be counterbalanced by the use of on average less than difunctional hydroxyl or amino compounds or even monoisocyanates, so that chemical crosslinking of the product is substantially prevented. Examples of higher isocyanates and monofunctional compounds may also be found in the prior art cited above. Monoamines, such as butyl or dibutylamine, hydroxylamine, stearylamine, N-methylstearylamine, pyrrolidone or tetrahexylamine or butanone oxime, and also monoalcohols such as 1-butanol, 2-ethyl-1-hexanol, 1-dodecanol, isobutanol or tert.-butanol, cyclohexanol or ethylene glycol monomethylether, are mentioned by way of examples. These mixtures do not belong to the preferred range.

The usual catalysts, release agents, antistatic agents, flameproofing agents, fillers, glass fibers and pigments known in the art (cf. for example DE-OS No. 2,854,409, DE-OS No. 2,920,501 and DE-PS No. 3,329,775) may be added during the polyurethane reaction (as component (D)). Suitable catalysts include tertiary amines, organometallic compounds, particularly organic tin, lead and titanium compounds, for example tin(II) acetate, tin(II) ethylhexoate, dibutyl tin dilaurate or lead acetate. Suitable release agents include waxes, oils and long-chain compounds containing carboxyl, ester, amide, urethane or urea groups and silicones of the type described as release agents in DE-OS No. 2,204,470.

In the process according to the invention, the quantities of reaction components (A) and (C) are generally selected so that the NCO:OH equivalent ratio of isocyanate- to OH-compounds is between 0.9 and 1.2 and preferably between 0.98 and 1.08 (corresponding to the molar ratio of the difunctional compounds (A) to (C)).

The following are examples of suitable monomeric acrylate and/or methacrylate compounds—Component (E):

Esters of acrylic or methacrylic acid with aliphatic, cycloaliphatic or araliphatic diols and/or polyols. The polyols may contain 3 or more, preferably 3 to 4, hydroxyl groups which may even be alkoxylated, preferably ethoxylated or propoxylated. Examples include esters of diols containing from 4 to 12 carbon atoms, such as ethylene glycol diacrylate, 1,3-propanediol diacrylate, 1,4-butanediol diacrylate, 1,6-hexanediol diacrylate, 1,12-dodecanediol di(meth)acrylate, trimethylol propane triacrylate, mixtures of pentaerythritol tri- and tetra-acrylate and also corresponding methacrylates, also di(meth)acrylates of polyether glycols of glycol, 1,3-propanediol, 1,4-butanediol, triacrylates or methacrylates of trimethylolpropane alkoxylated with 2 to 6 mols ethylene oxide or propylene oxide. Hydroxyalkylmethacrylates containing one or more hydroxyl groups per molecule are very much less preferred. Examples are monofunctional hydroxyl derivatives (less preferred), such as hydroxyethylacrylate, 2-hydroxyethylmethacrylate, 2-hydroxypropylacrylate, 2-hydroxypropylmethacrylate, 3-hydroxypropylacrylate, 3-hydroxypropylmethacrylate, 4-hydroxybutylacrylate, 4-hydroxybutylmethacryalte, 3-chloro-2-hydroxypropylacrylate, 3-chloro-2-hydroxypropylmethacrylate, 6-hydroxyhexylacrylate, 6-hydroxyhexylmethacrylate. Compounds containing one OH-group and two or more (meth)acrylate residues are more suitable, examples of compounds such as these being glycerol diacrylate and dimethylmethacrylate, trimethylolpropane diacrylate, trimethylolpropane dimethacryalte, pentaerythritol triacrylate, pentaerythritol trimethacrylate and also esters of acrylic or methacrylic acid with ethoxylated or propoxylated alcohols. Acrylic compounds containing only one hydroxyl group should only be used in small quantities (<10, preferably <4 mol of (E)), because otherwise chain termination in the polyurethane may go too far.

Suitable acrylates containing two OH- or NH-groups are, for example, the monoacrylates of glycerol, trimethylolpropane, pentaerythritol and monoacrylates of the ethoxylates or propoxylates of these polyols. However, they are not suitable for use as sole crosslinking components (E).

Hydroxyamines obtained by stoichiometric reaction of dialkanolamines, such as diethanolamine or diisopropanolamine, with diisocyantes, such as 2,4-tolylene diisocyanate or isophorone diisocyanate, and hydroxyalkylacrylates, for example hydroxyethylacrylate or hydroxypropylacrylate or the corresponding methacrylate, the reaction being carried out by reacting the hydroxyalkylacrylate with the diisocyanate in a first step and then reacting the product of that reaction with the dialkanolamine in a second step, are also unsuitable for use as sole components (E). They have to be used along with at least 50, preferably at least 80 weight % of OH— and/or amino group-free esters of acrylic or methacrylic acid with diols or polyols.

Of the compounds already mentioned, particular preference is attributed to the polyacrylates or polymethacrylates, such as butanediol acrylate, butanediol methacrylate, but especially trimethylolpropane triacrylate, trimethylolpropane trimethacrylate, pentaerythritol tetraacrylate and pentaerythritol tetramethacrylate, and to the corresponding alkoxylation products of trimethylolpropane or pentaerythritol with 2 to 6 mols ethylene oxide and/or propylene oxide, preferably after substantially complete esterification with acrylic or methacrylic acid.

The non-functional di- and/or polyacrylates or methacrylates are preferred to the pure hydroxyfunctional acrylates or methacrylates which produce less suitable elastomers or even less favorable properties in the radiation-crosslinked products.

However, it has been found that the technical crosslinking agents, such as trimethylolpropane trismethacrylate or pentaerythritol tetraacrylate, contain as impurities small amounts of compounds which have not been completely esterified, for example trimethylolpropane bis-methacrylate and pentaeryrthritol tris-acrylate. Nevertheless, technical mixtures such as these may also be used in accordance with the invention provided they contain predominant quantities of completely esterified polyacrylates.

In order to protect the acrylates or methacrylates against undersirable premature polymerization during the production of the polyurethanes, from 0.01 to 3% by weight and preferably from 0.03 to 1% by weight, based on the above-mentioned mixture as a whole, of polymerization inhibitors or antioxidants (F) should be added in cases where they are used or alternatively in the starting materials, for example in the polyols (A). A quantity of from 0.03 to 0.3% by weight is especially preferred. Polymerization inhibitors are normally added to the acrylates to prevent premature polymerization (c.f. Ullmanns Encyclopadie der Technischen Chemie, 4th Edition, Vol. 7, page 90). Although 10 to 200 ppm of inhibitors are sufficient, larger quantities are not used because they considerably reduce or even completely prevent subsequent polymerization. This is completely surprising since the highly stabilized masses produced according to the invention can be crosslinked without difficulty during their processing.

Where the polyurethanes are synthesized from starting components (A) to (C), components (E) (acrylate or methacrylate compounds) and (F) (inhibitors or stabilizers) are added to the polyurethane components before (less preferred) or during the polyurethane reaction in a quantity of from 3 to 24% by weight and preferably in a quantity of from 5 to 15% by weight. For example, compounds (E) and/or (F) may be added to the individual components, preferably to the relatively high molecular weight compounds (A) or to the chain-extending agents (B). However, compounds (E) and (F) may also be added to the reaction mixture at the outset or, preferably, to the already reacting polyurethane mixture at the later stages of the polyurethane reaction and preferably towards the end of the reaction.

The polyurethane reaction is preferably carried out continuously in a single stage, for example by the moving-belt process (casting process) according to DE-OS No. 3,224,324 or in twin-screw reaction extruders, for example in accordance with DE-OS No. 2,854,409.

In this connection, it is important that there should only be moderate heating applied in order to prevent undesirable premature polymerization in the presence of the crosslinking agent (E). At low temperatures, heat may be applied over prolonged periods without undesirable crosslinking occurring. At relatively high temperatures, the reaction should be limited to a few minutes. Thus, the following time-temperature relations on the crosslinker-containing PU-compositions are particularly suitable:

| | |
|---|---|
| at 160-170° C., approx. | ≦30-40 minutes, |
| at 170-180° C., approx. | ≦20-25 minutes, |
| at 180-190° C., approx. | ≦10-15 minutes, |
| at 190-200° C., approx. | ≦5-10 minutes, |
| at 200-220° C., approx. | ≦3-5 minutes, |
| >220° C., approx. | 1-3 minutes. |

The following procedures are suitable:

In small-scale tests, the components are preheated, stirred together and poured out onto metal sheets or heatable casting tables. Different maximal temperatures are reached (for the same starting temperatures), depending on the thickness of the layer. The cast layers hold the temperature ranges layer. The cast layers hold the temperature ranges for example for 20 to 30 minutes. By controlling the starting temperatures, it is also possible to influence the maximum temperature in the crosslinker-containing composition.

In batch-type moving-belt processes (for example according to DE-OS No. 3,224,324), the time spent at around maximum temperature may be shortened by cooling the mass by blowing on air in cooling zones. After the mass has solidified sufficiently, it may be quenched in liquids.

In twin-screw extruders (preferably fitted with kneading discs), the polyurethane reaction is preferably initiated at relatively high temperatures (for example at 220°-240° C.), the reaction mixture of components A-D is cooled down (for example to 180°-210° C.) in the zones following the formation of the polyurethane melt, component (E) and (F) are added and the mass rapidly discharged with further cooling. The residence time at 180° to 220° C. is less than 5 minutes and preferably less than 3 minutes after introduction of the crosslinking component (E). Thereafter, the mass is cooled down to safe temperatures (around >140° C.) in liquid baths and is then preferably granulated.

In a particularly preferred embodiment, the components may be reacted for instance, in a single stage in accordance with DE-OS No. 2,854,409, in a self-cleaning twin-screw kneading extruder. Temperatures of from 140° to 230° C. and preferably of from 170° to 210° C. are used and the reaction mixture is then cooled or quenched in less than 5 minutes and preferably in less than 3 minutes to a temperature below 140° C. and preferably to a temperature below 130° C. In a particularly preferred embodiment of the reaction the polyurethane elastomers are continuously formed from components (A) to (D) in the front parts of the extruder there having had their maximum reaction temperature, the acrylate or methacrylate compounds used as crosslinking components (E) are then added in liquid form into the rear part of the reaction screw extruder and mixed with the elastomer at the preferred low temperatures below 230° C., and then the mixture formed is subsequently quenched to temperatures below 140° C. in less than 5 minutes and preferably in less than 3 minutes after addition of the crosslinking component (E). Reaction kneaders, such as continuous-action co-kneaders, for example of the type made by Buss, may even be used as mixers for the continuous reaction with the crosslinking component optionally added at a later stage.

PUR-elastomer (granulates) are thus obtained which are still easy to process, but which have already undergone the change in their structure to the extent that a significant improvement in their properties is observed even without radiation crosslinking.

This is not the case in the less preferred process where the crosslinking component (E) is mixed with already preformed PUR-elastomers in the extruder. In this process, preformed PUR-granulate is melted in the front part of the twin-screw extruder and the crosslinking component (E), optionally together with (F), is continuously introduced into the resulting melt (with decreasing temperature profile). After a residence time of less than 5 minutes, the melt is discharged and rapidly cooled, preferably in liquid baths, such as water, and subsequently granulated. The acrylate- or methacrylate-containing polyurethane granulates obtained by this method are uncrosslinked and show good thermoplastic processing behavior. They may be processed by the usual processing machines for thermoplasts, such as extruders, injection molding machines, extrusion and blow-forming machines, calenders, film blowing machines, deep drawing machines, but preferably in continuous machines, such as extruders.

Extrudates obtained from the thermoplastic polyurethane elastomers containing crosslinking agents and inhibitors may be crosslinked by exposure to high-energy radiation, such as $\beta$- and/or $\gamma$-radiation. They are preferably crosslinked by electron beams ($\beta$-radiation) in a radiation dose of from 5 to 100 and preferably from 10 to 30 Mrad. Corresponding shaped articles have advantages, for example in their dimensional stability under heat (hot-set test), in their improved resistance to hydrolysis and solvents and in their better compression set at elevated temperatures as compared to uncrosslinked polyurethanes. In addition, the radiation-crosslinked shaped articles according to the invention show virtually no flow, so that they do not drip in a flame and thus make no contribution to flame propagation. This opens up new applications with new property combinations, including dimensionally stable (under heat) profiles, seals, toothed belts, damping elements, gear wheels, panels, exterior and interior bodywork components, hoses which are resistant to solvents for example to gasoline or fuel, rollers and seals.

The radiation-crosslinked extrudates may also be used for electrical applications, for example for sheathing, or fiberoptics applications, particularly where flameproof properties are required.

The invention is further illustrated, but is not intended to be limited by the following examples in which all parts and percentages are by weight unless otherwise specified.

EXAMPLES (I) Production of the thermoplastic radiation-crosslinkable PU-elastomers according to the invention (A) by the casting process

EXAMPLE 1 (according to the invention)

Constituents:
(a) 59.69% by weight 1,4-butanediol-adipic acid-polyester diol, molecular weight 2250 (OH No. 50) (component A)
a mixture
(b) of
  9.09% by weight trimethylolpropane tris-methacrylate (TRIM) (Component E) 0.06% by weight
  2,6-di-t-butyl-4-methylphenol (Component F)
  0.60% by weight 2,2'-6,6'-tetraisopropyldiphenyl carbodiimide (Component D)
  0.36% by weight stearylamide (Component D)
(c) 6.00% by weight 1,4-butanediol (Component B)
(d) 24.23% by weight 4,4'-diisocyanatodiphenylmethane (MDI) (Component C).

Production of the granulate (Example 1A)

Components (b) and (c) are added to the dehydrated polyester diol (a) with stirring at a temperature of approximately 110° C. The temperature of the mixture falls to 100° C. The diisocyanate (MDI) melted at 60° C. is then added with intensive stirring until the urethane reaction starts (increase in viscosity). The reaction mixture is poured into a tank heated first to 80°–100° C. with a Teflon support and then heated and held for about 30 minutes at 110° C. The sheet is then cut into strips and granulated. A reaction temperature of 160° C. is not exceeded during production. The obtained PU-elastomer is uncrosslinked and shows good thermoplastic process behavior and good mechanical strength values. If a high temperature, for example 150° C., is reached (by heating the starting materials) the mechanical properties of the elastomers deteriorate very considerably (cf. Example 1-0).

The granulate is injection-molded into 2 mm plates. The properties of the molded plates after electron bombardment (a dose of 15 to 30 Mrad; a Van de Graaf generator is used for bombardment) and shown in Table 1.

The dose of 15–30 Mrad was found to be favorable in preliminary tests. Below 10 Mrad, there is no clear crosslinking while above 30 Mrad there is a reduction in tensile strength. Accordingly, all the following tests were carried out with a radiation dose in the range of 15 to 30 Mrad (=150 and 300 J/g).

TABLE 1

| Properties of the radiation-crosslinked TPU (Example 1A) | | | |
|---|---|---|---|
| Test for: | Test Standard | Measured Value | Unit |
| Tensile strength | DIN 53504 | 39 | MPa |
| Breaking elongation | DIN 53504 | 330 | % |
| Residual material after 15 h in DMF at 120° C. | | 30 | % |
| Elongation under heat at 220° C. { Elongation under load | VDE 0472 | 33 | % |
| permanent elongation | §615 | 5 | % |

EXAMPLES 1, B TO H

The adducts according to the invention also include formulations 1B to 1H in Table 2. Production was carried out in the same way as in Example 1A except in the case of Example 1H where the TPU was prepared by the less preferred prepolymer process which is described in DE-PS No. 1,940,181. In Examples 1B and 1C, the quantity of TRIM was varied. In Examples 1D and 1E, the reaction temperature was varied considerably in comparison to Example 1A. In Examples 1F to 1G, the acrylates (E) were varied. In Example 1H, the PU-basis was changed.

The properties of the irradiated test specimens are shown in Table 3.

at temperatures of from 0° to 350° C. The depth of penetration (d) is recorded on the ordinate.

By comparison, an uncrosslinked, thermoplastic polyurethane on the same basis softens much earlier. Thus, the second softening point in Comparison Example K (FIG. 2) is at 142.5° C. as opposed to 157° C. in

TABLE 2

| Examples according to the invention (casting process) | 1-B | 1-C | 1-D | 1-E | 1-F | 1-G | 1-H* |
|---|---|---|---|---|---|---|---|
| Adipic acid/1,4-butanediol/polyester diol MW 2250; OH No. 50 | 62.58 | 55.52 | 58.55 | 58.55 | 59.87 | 61.59 | 20.07 |
| Polypropylene oxide ether diol MW 2000; OH No. 56 | | | | | | | 26.67 |
| Polypropylene oxide ether triol MW 3000; OH No. 56 | | | | | | | 1.40 |
| Trimethylolpropane tris-methacrylate (TRIM) | 4.76 | 14.88 | 10.01 | 10.01 | | | 6.29 |
| Trimethylolpropane tris-acrylate (TMPTA) | | | | | 9.00 | | |
| Pentaerythritol tris/tetraacrylate mixture (OH No. = 132) | | | | | | 4.99 | |
| 2,6-di-t-butyl-4-methylphenol | 0.06 | 0.06 | 0.06 | 0.06 | 0.06 | 0.04 | 0.11 |
| 2,2'-6,6'-tetraisopropyl diphenyl-carbodiimide | 0.63 | 0.56 | 0.59 | 0.59 | 0.60 | 0.62 | 0.14 |
| Stearylamide | 0.38 | 0.33 | 0.35 | 0.35 | 0.36 | 0.37 | 0.42 |
| 1,4-butanediol | 6.26 | 5.55 | 5.86 | 5.86 | 5.99 | 6.16 | 7.02 |
| 1,6-hexanediol | | | | | | | 0.28 |
| 4,4-diisocyanatodiphenylmethane | 25.3 | 23.04 | 24.59 | 24.59 | 24.13 | 26.24 | 29.59 |
| NCO/OH equivalent ratio | 1.03 | 1.03 | 1.03 | 1.03 | 1.03 | 1.03 | 1.005 |
| Maximum reaction temperature °C. | 168 | 150 | 140 | 172 | 148 | 165 | 180 |

*prepared via NCO—prepolymer (less preferred)

TABLE 3

Properties of the radiation-crosslinked thermoplastic polyurethane elastomers of Examples 1B to 1H.

| Test | | Standard | 1B | 1C | 1D | 1E | 1F | 1G | 1H | Unit |
|---|---|---|---|---|---|---|---|---|---|---|
| Modulus 100% | | DIN 53504 | — | 29 | 14 | 15 | 10 | 11.4 | — | |
| Tensile strength | | DIN 53504 | 31 | 38 | 35 | 35 | 33 | 25 | 30 | MPa |
| Breaking elongation | | DIN 53504 | 480 | 200 | 355 | 339 | 375 | 235 | 425 | % |
| Elasticity | | DIN 53512 | — | — | 32 | — | 31 | — | — | % |
| Compression set (after 24 h at 100° C.) | | DIN 53517 | — | — | — | — | — | — | — | % |
| Abrasion | | DIN 53516 | — | — | 57 | 67 | 77 | 63 | — | mm³ |
| Residual material after 15 h in DMF at 120° C. | | | 18 | 45 | 27 | 30 | 22 | 21 | 4 | % |
| Elongation under heat at 200° C. | Elongation under load | VDE 0472 | 53 | 20 | 20 | 15 | 15 | 5 | 180 | % |
| | permanent elongation | §615 | 20 | 5 | 0 | 0 | 0 | 0 | 70 | % |
| Swelling in CH₂Cl₂ | | | | | | | | | | |
| after 24 hours | | | — | — | 167 | 173 | 231 | 245 | — | % by weight |
| after 28 days | | | — | — | 172 | 181 | 240 | 256 | — | % by weight |

The thermoplastic, radiation-crosslinkable polyurethane elastomers of Examples 1A to 1H may be thermoplastically processed in standard injection-molding machines and extruders. After irradiation, their properties differ distinctly in certain aspects from those of uncrosslinked polyurethane elastomers (see Example 1K); in particular, high-temperature performance is improved, compression set becomes distinctly more favorable and the required elongation under heat test according to VDE 047, Paragraph 615, which is of significance in the cable industry, is easily met, in some cases without any permanent elongation. By contrast, uncrosslinked thermoplastic polyurethane elastomers fail this test, even during the heating-up phase. This behavior at elevated temperature is also evident upon measurement of thermal softening by thermomechanical analysis (TMA)—see FIG. 1. The thermomechanical measurements shown in FIG. 1 were carried out on 0.85 mm thick test specimens produced in accordance with Example 1A at a heating rate of 5° K./minute, under load of 0.05N and Example 1A according to the invention (see FIG. 1). The third softening point is completely missing in the Comparison Example, the test specimen having no resistance to penetration at temperatures even less than 200° C.

The solvent resistance of the crosslinked polyurethanes is distinctly lower (approx. 50%) than that of uncrosslinked comparison polyurethanes.

COMPARISON EXAMPLES 1I TO 1P

Mixtures 1I to 1P are included among the Comparison Examples and are shown in Table 4. Their mechanical properties are shown in Table 5.

The test specimens of the irradiated thermoplastic polyurethane of mixture 1K, which was prepared without any radiation-crosslinkable additive (E), fails the elongation under heat test after a short time and shows distinctly poorer behavior than Example 1A according to the invention both in thermomechanical analysis and also in the shear modulus curve at elevated temperatures. After storage for 15 h in DMF at 120° C., the test specimen has dissolved.

Mixture 1-I contains a urethane-containing incorporable dihydroxyacrylate as crosslinking component. Mixture 1L, in which the trimethylolpropane trimethacrylate was replaced by triallyl cyanurate, is not different from mixture 1K either in the elongation under heat test or in the DMF-storage test.

In mixture 1M, the quantity of trimethylolpropane trimethacrylate is too small to show any improvement over mixture 1K.

Mixture 1N contains butenediol as double bond component. It was incorporated in the polyurethane instead of the chain-extending agent butanediol. Apart from very poor basic strengths, this mixture is no different from mixture 1K.

In mixture 1-O, the reaction temperatures were so high (final temperature 190° C.) that (partial) polymerization of the acrylate occurred during the actual casting process so that the PUR-elastomers obtained could no longer be smoothly processed and showed seriously impaired mechanical strength values (compare Example 1A). In mixture 1P, the inhibitor 2,6-di-t-butyl-4-methylphenol was left out. The polyol mixture of ester, butanediol and acrylate swelled at a temperature of 80° to 100° C., so that polyaddition with the isocyanate was no longer reasonably possible.

The continuous production of the thermoplastic PU-elastomers according to the invention using a twin-screw kneading machine for the reaction is preferred.

A twin-screw kneading machine of the ZSK 53 V type made by Werner & Pfleiderer, Stuttgart, with self-cleaning screws and approx. 20% kneading elements was met. The process part consists of 12 separately heatable housings while the length of the process part corresponds to approximately 20 times the screw diameter.

The mode of operation of the screw kneading machine, including its kneading and transporting elements, is described in detail in manuals published by Werner & Pfleiderer and in DE-AS No. 2,302,564.

The residence time of the reaction melt in the kneading machine is generally from 0.3 to 5 minutes and preferably from 0.5 to 3 minutes. The temperature of the screw barrels is of the order of 60° to 220° C. (approx. 80° to 250° C. in the feed zone; approx. 150° to 220° C. in the middle of the extruder and approx. 80° to 200° C. in the discharge zone). Maximum temperatures of $\leq 220°$ C. are preferred, maximum temperatures of $\leq 210°$ C. being particularly preferred. The extrudate is quenched and comminuted in known manner. It is important that after the addition of the acrylate, the reaction mixture is cooled within 5 minutes (preferably

TABLE 4

|  | Example number (quantities in % by weight) | | | | | | |
| --- | --- | --- | --- | --- | --- | --- | --- |
|  | 1-I | 1-K | 1-L | 1-M | 1-N | 1-O | 1-P |
| Adipic acid/1,4-butanediol/polyester diol MW 2250; OH No. 50 | 60.65 | 65.57 | 59.81 | 64.14 | 65.57 | 58.55 | 59.71 |
| Triallylcyanurate (for comparison) | — | — | 9.09 | — | — | — | — |
| Trimethylolpropane trimethacrylate (TRIM) | — | — | — | 2.44(*) | — | 10.01(**) | 9.09 |
| PRY-3732-2[1] | 4.89 | — | — | — | — | — | — |
| 1,4-butenediol | — | — | — | — | 6.56 | — | — |
| 2,6-di-t-butyl-4-methylphenol | 0.04 | 0.07 | 0.06 | 0.06 | 0.07 | 0.06 | none |
| 2,2'-6,6'-tetraisopropyldiphenyl-carbodiimide | 0.61 | 0.66 | 0.60 | 0.64 | 0.66 | 0.59 | 0.60 |
| Stearylamide | 0.36 | 0.39 | 0.36 | 0.38 | 0.39 | 0.35 | 0.36 |
| 1,4-butanediol | 6.07 | 6.56 | 5.98 | 6.41 | — | 5.86 | 6.00 |
| 4,4'-diisocyanatodiphenylmethane | 27.00 | 26.75 | 24.10 | 25.91 | 26.75 | 24.59 | 24.24 |
| NCO/OH equivalent ratio | 1.03 | 1.03 | 1.03 | 1.03 | 1.03 | 1.03 | 1.03 |
| Max. temperature °C. in the casting process[2] | 172 | 160 | 178 | 180 | 178 | 192 | 168 |

[1]PRY-3732-2 = reaction product of 1 mol isophorone diisocyanate with 1 mol hydroxyethylacrylate and 1 mol diethanolamine
[2]On the casting table, these temperatures are maintained for about 30 minutes with gradual cooling.
(*)quantity used too small
(**)max. temperature during casting too high.

TABLE 5

Properties of the comparison radiation-crosslinked thermoplastic polyurethane elastomers of Examples 1K to 1P

| Test | | Standard | Comparison Example Number | | | | | | | Unit |
| --- | --- | --- | --- | --- | --- | --- | --- | --- | --- | --- |
|  |  |  | 1I | 1K | 1L | 1M | 1N | 1O | 1P |  |
| Modulus | | DIN 53504 | 6.0 | 5 | — | — | — | 13 | — | MPa |
| Tensile strength | | DIN 53504 | 30.3 | 37 | 30 | 12 | 15 | 15 | — | MPa |
| Breaking elongation | | DIN 53504 | 469 | 470 | 610 | 480 | 590 | 180 | — | % |
| Elasticity | | DIN 53512 | — | 43 | — | — | — | 29 | — | % |
| Compression set to 24 h at 100° C. | | DIN 53517 | 85 | 84 | — | — | — | 97 | — | % |
| Abrasion | | DIN 53516 | 28 | 27 | — | — | — | — | — | mm³ |
| Residual material after 15 h in DMF at 120° C. | |  | 0.0 | 0.0 | 0.0 | 0.0 | 0.0 | 27 | — | % |
| Elongation under heat at 200° C. | Elongation under load | VDE 0472 | failed | failed | failed | failed | failed | — | 30 | % |
|  | permanent elongation | 615 | 150 | — | — | — | — | — | 0 | % |
| Swelling in CH₂Cl₂ 24 h | | — | 424 | 342 | — | — | — | 194 | — | % by weight |
| 28 d | | — | 450 | 376 | — | — | — | 195 | — | % by weight | within 3 minutes) to a temperature of <140° C. (preferably 130° C.).

The thermoplastic polyurethane elastomers were produced from the following starting materials in the quantities (parts by weight) indicated:

EXAMPLE 2A (according to the invention)

Constituents:
a. 59.69% by weight adipic acid/1,4-butanediol/-polyester diol, molecular weight 2250 (OH No. 50) (component A)
   0.06% by weight 2,6-di-t-butyl-4-methylphenol (Component F)
   0.60% by weight 2,2'-6,6'-tetraisopropyl diphenylcarbodiimide (Component D)
b. 6.00% by weight 1,4-butanediol (Component B)
c. 0.36% by weight stearylamide (Component D)
d. 9.09% by weight trimethylolpropane tris-methylacrylate (TRIM) (Component E)
e. 24.23% by weight 4,4'-diisocyanatodiphenylmethane (MDI) (Component C)

The NCO/OH equivalent ratio is 1.03:1.

The polyester diol (a) was introduced into the housing 2 (fead zone) of a twin-screw kneading machine by means of a gear pump from a holding vessel kept at 120° C. The butane-diol (b) at room temperature was also introduced into the housing 2 by a small piston pump. Component (c) was introduced into housing 1 in powder form by a metering screw. Component (d) was introduced into housing 1 at room temperature by a gear pump. MDI, component (e), was pumped into housing 2 at a temperature of 60° C. by a gear pump. The following housing temperatures were adjusted in the screw kneading machine:

| Housing | 1 | 3 | 5 | 7 | 9 | 11 | 12 | head |
|---|---|---|---|---|---|---|---|---|
| Temperature | 100 | 200 | 180 | 200 | 190 | 14C | 140 | 180° C. |

Residence time 3 mins; extrudate quenched in a water bath and then granulated.

The crosslinked thermoplastic polyurethane elastomer obtained has the properties shown in Table 6 after processing in standard injection-molding machines and extruders followed by radiation crosslinking under the conditions described in Example 1A. These properties were determined both on test plates and also on extruded and irradiated cables. Processing in an extruder of the type normally used for processing TPU proceeds smoothly. A homogeneous, node-free extrudate is obtained.

TABLE 6

Properties of the radiation-crosslinked thermoplastic polyurethane elastomer of Example 2A

| Test for: | Test Standard | Plate | Cable | Unit |
|---|---|---|---|---|
| Modulus 100% | DIN 53504 | 15 | — | MPa |
| Tensile strength | DIN 53504 | 31 | 35 | MPa |
| Breaking elongation | DIN 53504 | 320 | 394 | % |
| Elasticity | DIN 53512 | — | — | % |
| Residual material after 15 h in DMF at 120° C. | | 34 | 19 | % |
| Elongation under heat / Elongation under load | VDE 0472 | 50 | 45 | % |

TABLE 6-continued

Properties of the radiation-crosslinked thermoplastic polyurethane elastomer of Example 2A

| Test for: | Test Standard | Plate | Cable | Unit |
|---|---|---|---|---|
| at 200° C. / permanent elongation | §615 | 15 | 10 | % |

EXAMPLE 2B (Preformed PUR-granulate; addition of crosslinking agent during extrusion).

A preformed thermoplastic polyurethane elastomer granulate corresponding to the formulation of Example 1A without the trimethylolpropane trimethylacrylate was prepared using a Werner & Pfleiderer type ZSK 53 V twin-screw extruder fitted with kneading discs (same as Example 2A). The temperature profile in the twin-screw extruder is as follows:

| Housing | 1 | 2 + 3 | 4 + 5 | 6 + 7 | 8 + 9 | 10 + 11 | 12 | head |
|---|---|---|---|---|---|---|---|---|
| Temperature | 100 | 220 | 220 | 200 | 180 | 150 | 145 | 200° C. |

The TPU-granulate was introduced into housing 1 down a vibrating chute. The trimethylolpropane trimethacrylate was introduced into housing 6 of the extruder at room temperature by a peristaltic pump. The quantities used were 90.91 parts by weight polyurethane elastomers and 9.09 parts by weight acrylate crosslinking agent. The residence time of the melt after the introduction of the acrylate was kept as short as possible, i.e. from 0.3 to 3 minutes (various residence times between these limits were tried and did not produce any significant differences). The extrudate was quenched to temperatures of <130° C. by direct introduction into a water bath and then granulated.

The properties of the thermoplastic polyurethane elastomer of Example 2B radiation-crosslinked with a radiation dose of 20 Mrad are shown in Table 7.

TABLE 7

Properties of the radiation-crosslinked thermoplastic polyurethane elastomer of Example 2B

| Test for: | Test Standard | Value | Unit |
|---|---|---|---|
| Modulus 100% | DIN 53504 | 7.1 | MPa |
| Tensile strength | DIN 53504 | 35.4 | MPa |
| Breaking elongation | DIN 53504 | 480 | % |
| Compression, 24 h/100° C. | DIN 53517 | 75 | % |
| Residual material after 15 h in DMF at 120° C. | | 15 | % |
| Elongation under heat | | | |
| Elongation under load | VDE 0472 | 30 | % |
| Permanent elongation | 615 | 0 | % |
| Swelling in CH$_2$Cl$_2$ after | | | |
| 24 h | | 364 | % by weight |
| 28 d | | 383 | % by weight |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyurethanes suitable for thermoplastic processing comprising mixing I. at least 75% by weight of preformed thermoplastic polyurethane elastomers, or of a blend of
  (A) substantially bifunctional, compound essentially containing two Zerewitinoff-active hydrogen atoms per molecule and having a molecular weight of from 400 to 20,000,
  (B) substantially bifunctional chain-extending agents selected from the group consisting of diols and diamines, having a molecular weight of from 32 to 399 and
  (C) organic diisocyanates,
wherein the molar ratio of the sum of (A) and (B) to the diisocyanates (C) is from 0.9 to 1.1, and optionally
  (D) which is at least one member selected from the group consisting of stabilizers, lubricants and other known additives and excluding peroxides and polymerization initiators which decompose into radicals under the effect of actinic light, with
II. (E) from 4 to 24% by weight of at least one monomeric acrylate and/or methacrylate compound which is characterized in that it is predominantly free of hydroxyl groups and predominantly nonincorporable and is derived from the corresponding acid and an aliphatic, cycloaliphatic or araliphatic monoalcohol containing at least six carbon atoms in the alcohol residue as crosslinking agent, and
III. (F) from 0.01 to 3% by weight of a polymerization inhibitor and/or an antioxidant
by adding said II and III to said I before complete formation of the highly polymeric polyurethane or to the melt of preformed polyurethane elastomer at a temperature below 230° C. and cooling the mixture to a temperature below 130° C. in less than 5 minutes in continuous extruders and optionally granulating the resulting mixture.

2. The process of claim 1, characterized in that it is carried out in a twin-screw extruder.

3. The process of claim 1 wherein said (E) comprises predominantly hydroxyl-group-free, nonincorporable esters of acrylic and/or methacrylic acid with aliphatic, cycloaliphatic or araliphatic diols and/or polyols containing 3 or more OH-groups or with the ethoxylation and/or propoxylation products of these diols or polyols which have 2 to 6 ethylene oxide and/or propylene oxide linkages per molecule.

4. The process of claim 1, wherein said (E) comprises acrylic acid and/or methacrylic acid esters of $C_4$–$C_{12}$ diols or of tri- or tetraalcohols.

5. The process of claim 1, wherein said (E) is a member selected from the group consisting of 1,4-butanediol acrylate, butanediol bis-methacrylate, trimethylolpropane tris-acrylate, trimethylolpropane trimethylacrylate, pentaerythritol tetraacrylate and pentaerythritol tetramethacrylate.

6. The process of claim 1, characterized in that said (E) is dissolved together with said (F) in said (A), after which the reaction is carried out.

7. The process of claim 1, characterized in that said (E) is added to said blend before complete formation of said urethane.

8. A process for the preparation of molded articles comprising forming an article by thermoplastic molding using the polyurethane of claim 1 and exposing said article to β-radiation in a dose of 10 to 30 Mrad.

* * * * *